United States Patent [19]

Bengtson

[11] Patent Number: 5,105,518

[45] Date of Patent: Apr. 21, 1992

[54] SICKLE KNIFE REMOVER AND INSTALLER AND METHOD

[76] Inventor: Lyle D. Bengtson, 14781 Tenth St., NE., Spicer, Minn. 56288

[21] Appl. No.: 653,697

[22] Filed: Feb. 11, 1991

[51] Int. Cl.⁵ .............................................. B23P 6/00
[52] U.S. Cl. .............................. 29/402.08; 29/402.03; 29/426.4; 29/792
[58] Field of Search ........... 29/402.01, 402.03, 402.08, 29/426.1, 426.4, 700, 792

[56] References Cited

U.S. PATENT DOCUMENTS

| | | | |
|---|---|---|---|
| 3,034,276 | 5/1962 | Hester | 56/291 |
| 3,037,342 | 6/1962 | Boyer | 56/296 |
| 4,198,803 | 4/1980 | Quick et al. | 56/296 |
| 4,380,889 | 4/1983 | Isbell | 56/296 |
| 4,854,114 | 8/1989 | Speck | 56/296 |

*Primary Examiner*—Timothy V. Eley
*Attorney, Agent, or Firm*—Kinney & Lange

[57] ABSTRACT

An assembly and method are provided for removing and installing a reciprocating sickle knife from or on a sickle knife holder. The sickle knife comprises a plurality of sickle knife sections attached to a knife back bar with spaced, repeating pattern or recurrent fasteners. The sickle knife is protected from damage by a plurality of sickle guards attached to the sickle knife holder. The assembly comprises first and second rotatable sprockets secured to a support member. The sprockets are interconnected by an endless chain which has drive lugs that will drivably engage recurrent fasteners on the sickle knife. In the preferred embodiment, two adjacent sickle guards are removed allowing the assembly to be installed on the sickle knife holder such that the chain is positioned adjacent the recurrent fasteners. A power source such as a hand crank, then drives or rotates the sprockets to drive the chain so that the recurrent fasteners are engaged with the drive lugs sequentially, displacing the sickle bar.

20 Claims, 4 Drawing Sheets

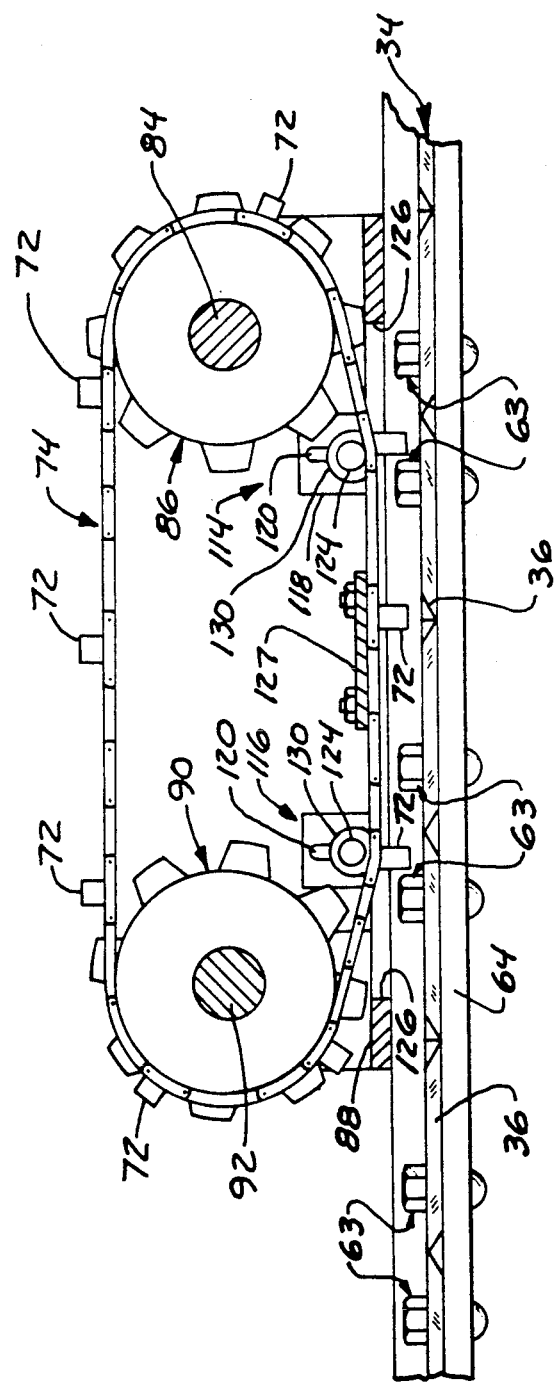

SICKLE KNIFE REMOVER AND INSTALLER AND METHOD

BACKGROUND OF THE INVENTION

The present invention relates to repair of reciprocating sickle knives and, more particularly, is directed to an apparatus and method for removing and installing sickle knives on sickle bars. Reciprocating sickles or knives used on combine and other harvesting equipment range in length from about 5 to 30 feet, either as a single unit or alternatively as a plurality of interconnected sections. In either case, the knife often comprises a plurality of sickle knife sections attached to a knife back or support bar with suitable fasteners such as rivets or threaded nuts and bolts. The knife sections and their fasteners are arranged longitudinally along the knife back in a spaced-apart, recurrent pattern. The knife is protected from debris such as stones found in the field by forwardly projecting, spaced sickle guards attached to the sickle bar which comprises a knife holder. End plates are provided to protect the end of the knife.

With normal use and wear, or in situations where the knife has been damaged, the knife must be removed and either be fixed or replaced with a new knife. Often the removal or installation procedure involves manually driving the knife longitudinally along the holder by pounding adjacent the end of the support bar. Since the knife is long and awkward to work with, care must be taken in order not to damage the ends of the knife or the knife holder.

SUMMARY OF THE INVENTION

The present invention provides a chain driven apparatus and method incorporating its use designed to remove and install a knife on a knife holder. The invention comprises first and second rotatable, aligned sprockets secured separately to a support frame. The support frame is adapted to be secured on the sickle knife holder, above the sickle or knife. An endless chain or other flexible member, interconnects the first sprocket with the second sprocket by engaging cogs of the first and second sprockets. The chain has lugs which are spaced so that on a lower length of the chain, the lugs drivably engage the fasteners of a sickle when the sprockets and chain are driven. As the chain is moved, the lugs engage the fasteners sequentially and will drive or displace the sickle knife longitudinally along the sickle knife holder.

The present invention further relates to a method for removing a knife from a sickle knife holder. As stated earlier, the knife comprises a plurality of knife sections attached to a support bar with recurrent fasteners such as rivet or threaded nuts and bolts. The knife is protected by a plurality of spaced sickle guards secured to the sickle bar. The method comprises providing an assembly having a first and second rotatable sprocket attached to a support member, and an endless chain interconnecting the sprockets; removing two adjacent sickle guards from the sickle bar; securing the assembly to the sickle bar in place of the removed sickle guards such that the chain is positioned adjacent the exposed ends of the recurrent fasteners; and driving the chain to contact the recurrent fasteners and move the knife.

In the preferred embodiment, the lugs on the chain engage the upper ends of the fasteners as the knife is held in the sickle bar and guards. Since the knife is below a mounting plate used to support the sprockets and chain, the mounting plate has a slot aligned with the fasteners to permit the lugs on the chain to engage the fasteners. An idler or guide is used to direct the chain and the lugs on the chain from each of the sprockets down into the space between the fasteners through the slot in the mounting plate. The idler supports include vertical slots which allows the height of the lugs to be adjusted. Vertical adjustment determines the depth of the lugs of the chain relative to the fasteners.

A hand crank is attachable to a drive shaft for the first sprocket. When the crank is rotated, the chain is driven on the rotatable sprockets such that the lugs carried on the chain sequentially engage the longitudinally spaced fasteners to either remove or install the knife. Since power to displace the knife is applied to the knife uniformly without sudden impacts to the end of the knife, damage to the knife is minimized.

BRIEF DESCRIPTION OF THE DRAWINGS

FIG. 4 is a front elevational view of the present invention mounted above the knife with elements removed to improve clarity;

FIG. 6 is a top plan view of the present invention mounted above the knife; and.

DETAILED DESCRIPTION OF THE PREFERRED EMBODIMENTS

Figure 1:
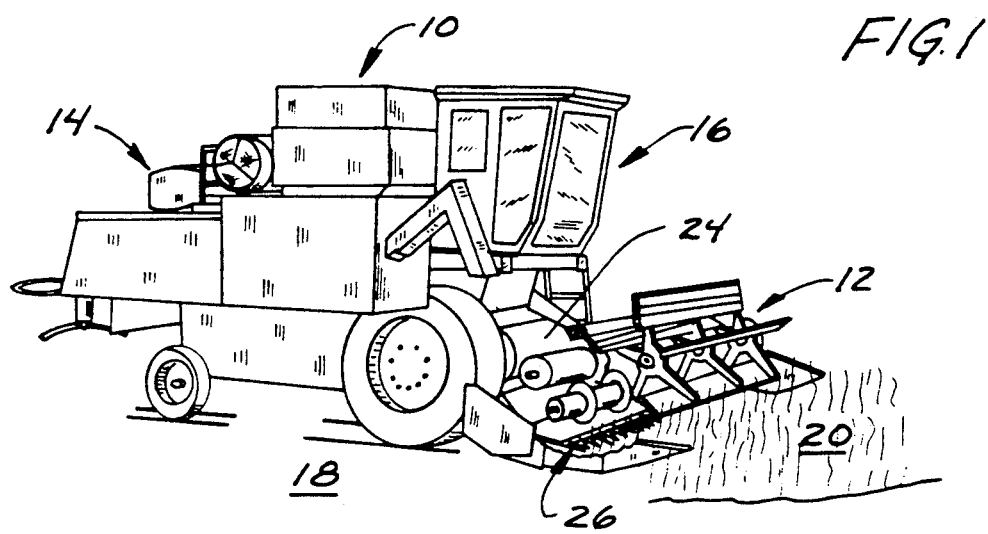
FIG. 1 is a fragmentary perspective view of a combine employing a reciprocating sickle or knife to cut field crops.

FIG. 1 shows a combine 10 for cutting wheat, oats, soybeans and other varieties of field crops. Combine 10 comprises a header 12, a crop processing area 14 and an operator control area 16. As combine 10 travels forward across a field 18, header 12 severs the individual stems of a crop 20. The cut crop 20 is then transferred to a combine opening 24 leading to crop processing area 14 where the grain is separated from the stems. Depending on the particular type of crop to be harvested, different headers can be used.

To cut and harvest field crops, header 12 includes a reciprocating cutting assembly 26. Cutting assembly 26 is located forward of combine opening 24 and lies substantially perpendicular to the forward motion of combine 10. Besides combines, reciprocating cutting assemblies are commonly found on swathers, mowers and other field harvesting machinery.

Figure 2:
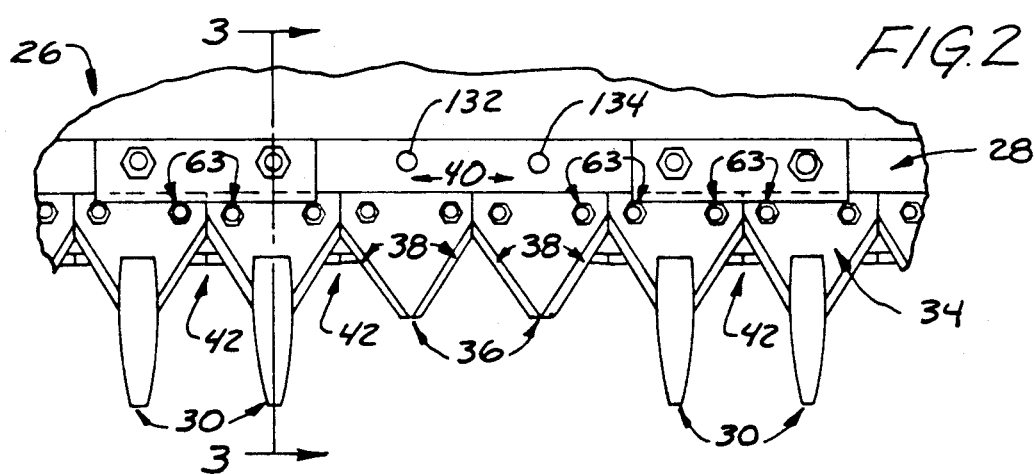
FIG. 2 is a top plan view of the knife mounted in a sickle bar with two spaced sickle guards removed.

Referring to FIG. 2, cutting assembly 26 comprises a header plate or sickle bar 28 with a plurality of evenly spaced stationary sickle guards 30. The sickle guards 30 and sickle bar 28 support a reciprocal cutting knife or sickle 34. Knife 34 is formed from a plurality of identically shaped knife sections 36. Each knife section 36 has two diagonal cutting edges 38. As header 12 progresses forward with combine 10, individual crop stems enter notches 42 formed between opposing cutting edges 38 of successive sickle knife sections 36. The crop stems are subsequently cut when knife 34 reciprocates longitudinally, according to double arrow 40, displacing cutting edges 38 toward opposing stationary sickle guards 30.

Figure 3:
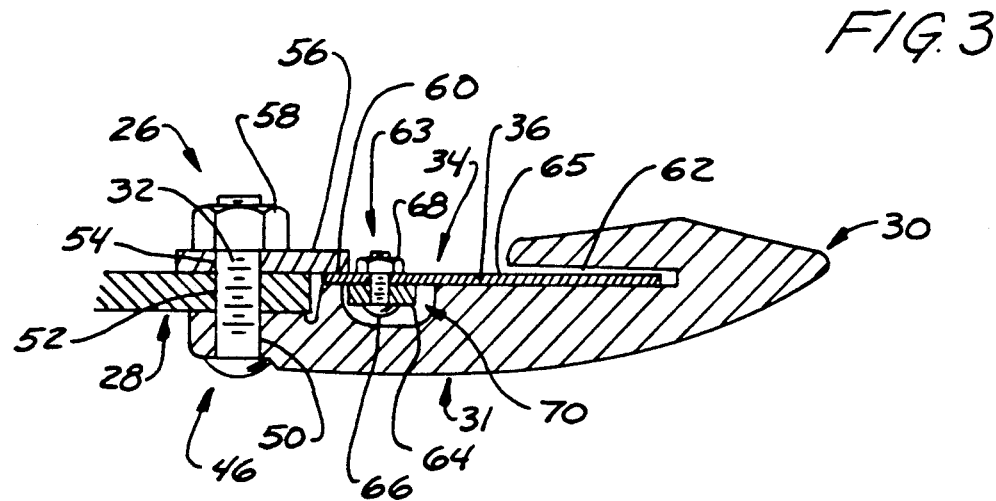
FIG. 3 is a cross-sectional view taken along line 3—3 of FIG. 2.

FIG. 3 shows a cross-sectional view of cutting assembly 26 through a single sickle guard 30. Sickle guard 30 comprises a lower support portion 31 that is secured to sickle bar 28 at a rearward end 46. A sickle guard bolt 32 protrudes through corresponding apertures 50, 52 and 54 in lower support portion 31, sickle bar 28 and an upper clamping plate 56, and fastens to a threaded nut 58. Upper clamping plate 56 overlaps lower portion 31 forming a rear channel 60. A co-planar forward channel 62 is provided in sickle guard 30. Channels 60 and 62 retain reciprocating knife or sickle 34 in cutting assembly 26 during the cutting operation.

FIG. 3 further shows construction of sickle or knife 34. With additional reference to FIG. 2, each knife section 36 of reciprocating knife 34 is secured to a knife back or support bar 64 with a fastener 63 comprising a bolt 66 and a nut 68. A channel 70 formed within each lower support portion 31 of sickle guard 30 provides necessary clearance for knife back 64 and the head of bolt 66 as knife 34 reciprocates in channels 60 and 62. As shown in FIGS. 2 and 3, fasteners 63 extend above an upper surface 65 of sickle knife sections 36 and are located longitudinally along blade 34 in a recurrent or repeating pattern where each sickle knife section 36 is attached to knife back 64 with two spaced fasteners 63 for each sickle knife section 36.

Sickle or knife 34 is removed as a single unit from cutting assembly 26. Commonly, this procedure involves disengaging knife 34 from any drive mechanism, and after removing any end plates that may be attached to cutting assembly 26, sliding knife 34 longitudinally along cutting assembly 26. Knife 34 is installed with a reverse procedure.

As stated earlier, prior to the present invention, removal and installation of knife 34 was done by hand. This procedure involved applying force to the end of knife 34 or alternatively to sickle knife section 36. In contrast, as shown in FIG. 4, the present invention removes and installs knife 34 by providing a moving endless flexible member comprising a drive chain 74. Chain 74 has lugs or teeth 72 mounted thereon which sequentially engage the recurrent spaced elements of knife 34, such as the upper ends of upstanding fasteners 63, thereby displacing these elements to the left or right, causing knife 34 also to move to the left or right.

Figure 5:
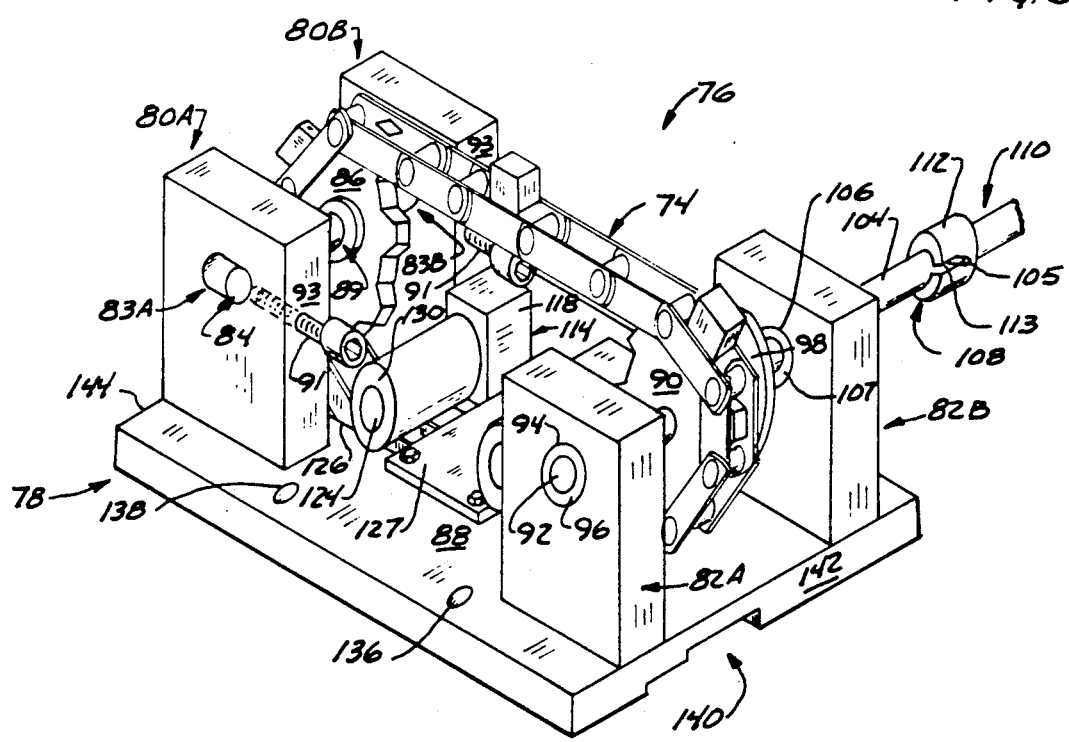
FIG. 5 is a perspective view of the present invention.

The reciprocating sickle knife assembly remover and installer of the present invention is shown generally as assembly 76 in FIG. 5. Assembly 76 includes a lower support plate member 78 with upstanding support blocks 80A, 80B, 82A and 82B. Support blocks 80A and 80B each have a horizontally oriented slotted aperture 83A and 83B, respectively, that receive a shaft 84. Shaft 84 supports a chain sprocket 86 spaced above an upper surface 88 of support plate 78. A bearing 89 interposed concentrically between shaft 84 and sprocket 86 allows sprocket 86 to rotate freely on shaft 84. Threaded adjustment bolts 91 are threaded inwardly through surfaces 93 of supports 80A and 80B, to separately contact shaft 84 at opposite ends and determine placement of shaft 84 in slots 83A and 83B to provide for adjustment.

Like supports 80A and 80B, supports 82A and 82B support a second sprocket 90 aligned with sprocket 86 above surface 88. Sprocket 90 is drivably mounted to a shaft 92 that extends through an aperture 94 in support member 82A. A bearing 96 concentrically located in aperture 94 allows rotation of shaft 92 and sprocket 90.

Figure 6:
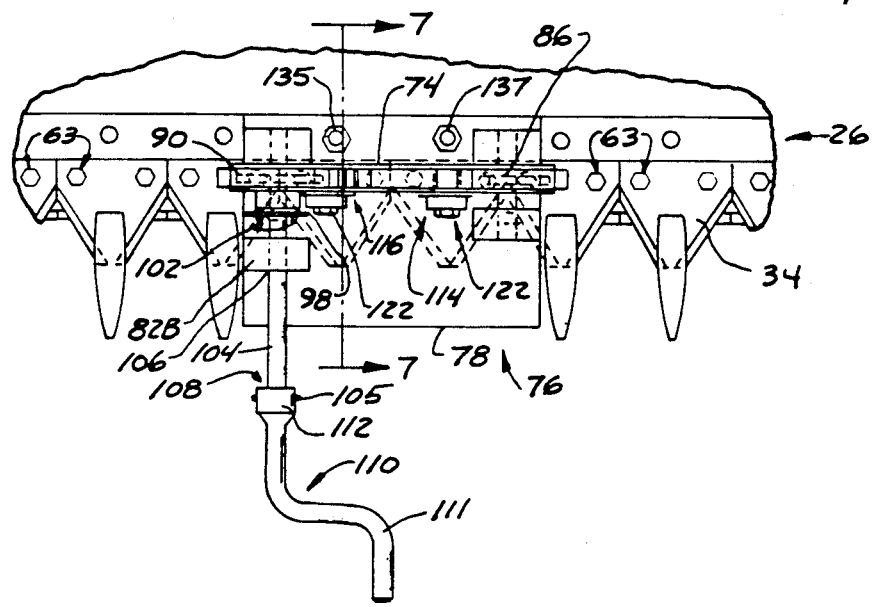

Shown in FIG. 6, a plate 98 is secured to a side of sprocket 90, between sprocket 90 and support member 82B, with threaded bolts 102. Plate 98 is attached to a drive shaft 104 that projects through an aperture 106 in support member 82B. A bearing 107, shown in FIG. 5, is provided in aperture 106 to allow drive shaft 104 and sprocket 90 to rotate relative to support member 82B.

FIGS. 5 and 6 show that chain 74 when mounted on sprockets 86 and 90 can be driven by a hand crank 110. Crank 110 comprises a bent handle connected to a drive sleeve 112. Sleeve 112 includes slots 113 that engage a cross pin 105 mounted through drive shaft 104 at a drive shaft end 108. Alternatively, other power sources such as an electric or hydraulic motor can be connected to drive shaft end 108 to rotate sprocket 90 and drive chain 74.

Figure 7:
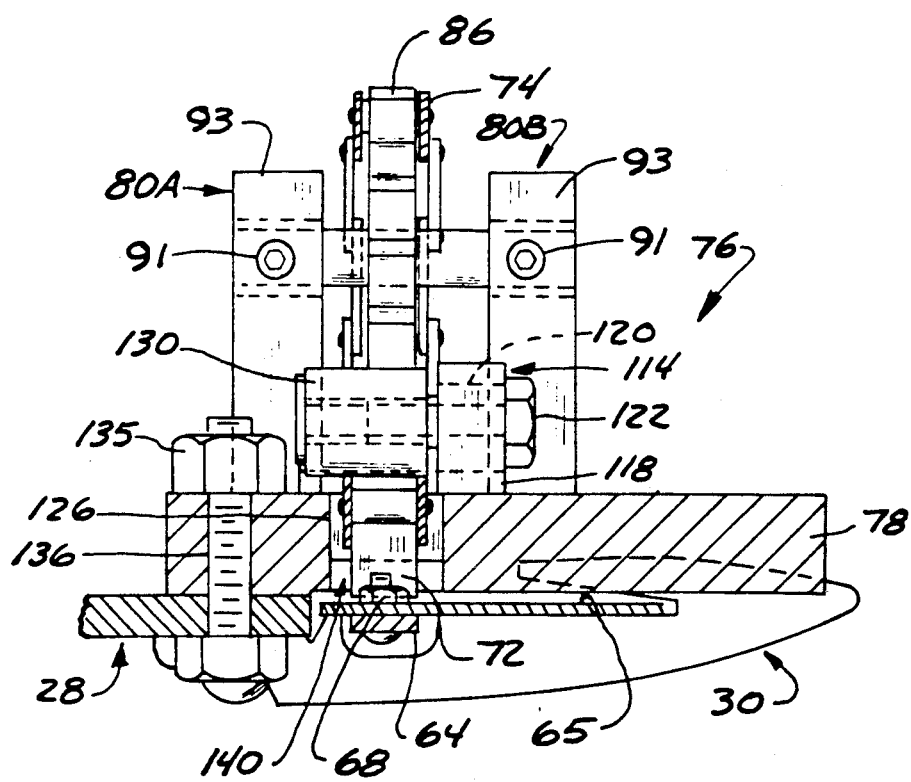
FIG. 7 is a cross-sectional view taken along 7—7 on FIG. 6.

Referring to FIGS. 4, 6 and 7 it is shown assembly 76 further includes chain deflecting means or adjustable idler roller assemblies 114 and 116. Adjustable roller assembly 114 is located adjacent sprocket 86 and comprises an upright support block 118 on plate 78, and having a vertical slot 120. A mounting bolt 122 protrudes through slot 120 and is threaded to an inner bar hub 124 on which roller 130 is rotatably mounted. As shown in FIG. 4, assembly 114 contacts chain 74, deflecting and guiding chain 74 down into a longitudinal slot 126 in support plate 78, between sprockets 87 and 90. Slot 126 extends through the plate member 78. The roller 130 on each hub 124 is adjusted so that chain 74 will be guided to travel along slot 126. Adjustable roller assembly 116 located adjacent sprocket 90 is identical to assembly 114. The rollers 130 are positioned so lugs 72 extend below plate 78 to provide a drive for removing knife 34. The rollers 130 also are positioned to insure that the lugs 72 clear the ends of slot 126 as the chain moves. A cover plate 127 bridging slot 126 is removably secured to upper surface 88 and prevents support member 78 from twisting along slot 126 and also holds the chain from lifting up and slipping when removing knife 34. Alternatively, chain 74 can be supported to protrude outwardly from a longitudinal edge of support member 78 thereby eliminating longitudinal slot 126.

Installation and operation of assembly 76 is a simple and quick procedure. FIG. 2 shows cutting assembly 26 with two adjacent sickle guards removed, thereby leaving standard, adjacent aperture 132 and 134 open. Corresponding apertures 136 and 138 in support plate 78, shown in FIG. 5, align with apertures 132 and 134 and enable mounting bolts 135 and 137, shown in FIG. 6, to secure assembly 76 to the sickle bar 28. Referring to FIG. 4, with assembly 76 properly mounted, slot 126 and chain 74 are positioned adjacent fasteners 63 on knife 34. In the preferred embodiment, the individual lugs or cogs 72 are spaced on chain 74 to correspond to the spacing of the fasteners 63 and to make sequential driving contact with the fasteners 63 to either remove or install knife 34. By adjusting roller assemblies 114 and 116 up or down, the extent of overlap between lugs 72 and the upper ends of fasteners 63 is selected. Channels 140, shown in FIG. 1, are formed on the bottom of plate 78 between the ends of slot 126 and end surfaces 142 and 144 to provide clearance for fasteners 63 as knife 34 is moved below support plate 78. When either knife removal or installation is complete, assembly 76 can be removed and the corresponding sickle guards replaced.

In summary, the present invention provides an assembly that easily removes or installs a sickle knife on a sickle knife holder. The first and second rotatable sprockets rotate the endless chain to engage sequentially spaced and recurrent fasteners on the knife. By engaging these recurrent fasteners, a drive is created and provided on the knife which substantially reduces or eliminates sickle bar or knife damage. Power to rotate the sprockets and drive the chain is provided from any convenient power source, such as a hand crank, electric or hydraulic motor. The chain can be replaced with a suitable belt or cable, or other endless flexible member, mounted on rotatable pulleys or drums and carrying lugs.

Although the present invention has been described with reference to preferred embodiments, workers skilled in the art will recognize that changes may be made in form and detail without departing from the spirit and scope of the invention.

What is claimed is:

1. A method for removing a reciprocating sickle knife from a sickle knife holder having spaced sickle guards, wherein the sickle knife comprises a plurality of sickle blades attached to a support bar with recurrent fasteners, the method comprising:
   providing an assembly having first and second rotatable supports attached to a support member, and an endless line member interconnecting the rotatable supports;
   mounting the assembly adjacent the sickle knife holder such that the endless line is positioned adjacent the recurrent fasteners; and
   driving the endless line to contact the recurrent fasteners and move the sickle knife.

2. The method of claim 1 wherein the step of driving comprises cranking a crank secured to the first rotatable support such that rotation of the hand crank moves the endless line.

3. The method of claim 1 wherein the step of mounting comprises removing two adjacent sickle guards from the sickle knife holder and securing the assembly to the sickle knife holder in place of the removed sickle guards.

4. An assembly for removing and installing an elongated reciprocating knife having spaced recurrent elements along a length thereof, the assembly comprising:
   a support member mountable adjacent a portion of the reciprocating knife;
   a first rotatable support mounted to the support member;
   a second rotatable support mounted to the support member such that the first and second rotatable supports are separated and rotate about parallel axes;
   an endless flexible member interconnecting the first rotatable support with the second rotatable support;
   the endless flexible member including means for engaging recurrent elements of a reciprocating knife adjacent the support member; and
   means for moving the endless flexible member such that recurrent elements of the knife are engaged sequentially by the means for engaging.

5. The assembly of claim 4 wherein the means for moving the endless flexible member comprises a drive shaft secured to drive one of the rotatable supports.

6. The assembly of claim 5 further comprising a hand crank secured to the drive shaft.

7. The assembly of claim 4 wherein the support member comprises a plate having a longitudinal slot between the rotatable support and below a lower length of the endless flexible member, the means for engaging recurrent elements of the knife extending through the slot to position below the plate.

8. The assembly of claim 7 and guiding means secured to the support member for guiding a length of the endless flexible member from the rotatable support into the slot, the path of movement of the endless flexible member being positioned substantially parallel to a length direction of the knife.

9. The assembly of claim 8 wherein the guiding means comprise a first support block secured to the support member having a first roller engaging the endless flexible member adjacent to the first rotatable support, and a second support block secured to the support member having a second roller engaging the endless flexible member adjacent to the second rotatable support.

10. The assembly of claim 9 wherein the rollers are adjustably fixed to permit adjusting the position of a length of the endless flexible member relative to the upper surface.

11. The assembly of claim 9 and a guide plate overlying the slot to maintain a portion of the endless flexible member in the slot.

12. The assembly of claim 1 wherein the means for engaging comprises spaced protruding lugs secured to the endless flexible member, the lugs sequentially drivably contacting the recurrent elements of the knife when the endless flexible member is driven by the rotatable supports.

13. An assembly for removing and installing a sickle knife from a sickle knife holder, the sickle knife having a plurality of sickle knife sections attached with spaced fasteners to a knife back bar along a longitudinal length of the knife back bar, the assembly comprising:
   a support member including a base having an elongated slot therethrough secured to the knife holder such that recurrent fasteners are aligned with and accessible through the slot;
   first and second rotatable supports mounted to the support member adjacent opposite ends of the slot;
   an endless line member interconnecting and drivably engaging the first and second rotatable supports, the endless line member further having a length positioned in the slot adjacent recurrent fasteners of the knife below the support member and having drive means thereon; and
   a drive shaft secured to drive one of the rotatable supports to move the endless line member such that current fasteners of the sickle knife are drivably engaged sequentially by the drive means.

14. The assembly of claim 13 further comprising a hand crank secured to the drive shaft.

15. The assembly of claim 13 wherein the rotatable supports are sprockets and the endless line member is a chain, and the drive means in the chain comprise spaced protruding teeth secured to the chain, the teeth contacting the recurrent fasteners of the sickle knife.

16. An assembly for removing and installing an elongated reciprocating knife having spaced recurrent elements along a length thereof and reciprocal in a reciprocating knife holder, the assembly comprising:
   a support member mountable adjacent a portion of the reciprocating knife;
   displacement means mounted to the support member for displacing the reciprocating knife within the reciprocating knife holder;

the displacement means including recurrent engagement means for engaging the recurrent elements of the reciprocating knife; and drive means for driving the displacement means such that the recurrent elements of the reciprocating knife are engaged sequentially by the recurrent engagement means.

17. The assembly of claim 16 wherein the displacement means is rotatable to cause the recurrent engagement means to sequentially engage the recurrent elements of the reciprocating knife.

18. The assembly of claim 17 wherein the displacement means comprise:

a first rotatable support mounted to the support member;

a second rotatable support mounted to the support member such that the first and second rotatable supports are separated and rotate about parallel axes; and an endless flexible member interconnecting the first rotatable support with the second rotatable support, the endless flexible member having the recurrent engagement means for engaging the recurrent elements of the knife.

19. The assembly of claim 18 wherein the drive means comprises a drive shaft secured to drive one of the rotatable supports.

20. The assembly of claim 16 wherein the recurrent engagement means comprise spaced protruding lugs secured to the displacement means, the lugs sequentially contacting the recurrent elements of the knife to displace the knife.

* * * * *

UNITED STATES PATENT AND TRADEMARK OFFICE
CERTIFICATE OF CORRECTION

PATENT NO.  : 5,105,518

DATED       : April 21, 1992

INVENTOR(S) : LYLE D. BENGTSON

It is certified that error appears in the above-identified patent and that said Letters Patent is hereby corrected as shown below:

Col. 6, line 25, delete "claim 1", insert "claim 4"

Signed and Sealed this

Twenty-ninth Day of June, 1993

Attest:

MICHAEL K. KIRK

Attesting Officer

Acting Commissioner of Patents and Trademarks